US009363597B1

(12) United States Patent
Kulavik et al.

(10) Patent No.: US 9,363,597 B1
(45) Date of Patent: Jun. 7, 2016

(54) DISTANCE-BASED AUDIO PROCESSING FOR PARAMETRIC SPEAKER SYSTEM

(71) Applicant: Turtle Beach Corporation, Poway, CA (US)

(72) Inventors: Richard Joseph Kulavik, San Jose, CA (US); Elwood Grant Norris, Poway, CA (US); Brian Alan Kappus, San Diego, CA (US)

(73) Assignee: Turtle Beach Corporation, San Diego, CA (US)

( * ) Notice: Subject to any disclaimer, the term of this patent is extended or adjusted under 35 U.S.C. 154(b) by 0 days.

(21) Appl. No.: 14/465,764

(22) Filed: Aug. 21, 2014

Related U.S. Application Data

(60) Provisional application No. 61/868,308, filed on Aug. 21, 2013.

(51) Int. Cl.
*H04B 3/00* (2006.01)
*H04R 3/00* (2006.01)

(52) U.S. Cl.
CPC .............. *H04R 3/00* (2013.01); *H04R 2430/00* (2013.01)

(58) Field of Classification Search
CPC ............... H04R 2217/03; H04R 1/403; H04R 2499/15; H04R 2499/11; H04R 3/12; H04R 3/00; H04R 2201/401; H04R 5/02; H04R 17/00; H04R 2201/023
USPC ........... 381/74, 77, 79, 111, 150, 190, 116, 1, 381/300, 309, 307; 700/94
See application file for complete search history.

(56) References Cited

U.S. PATENT DOCUMENTS

2007/0154036 A1* 7/2007 Matsuzawa ............ H04R 1/403 381/116
2008/0055548 A1* 3/2008 Matsuzawa ..................... 353/15
2008/0159571 A1* 7/2008 Hooley ......................... 381/307
2008/0232608 A1* 9/2008 Ullmann ........................ 381/77
2013/0315422 A1* 11/2013 Tanaka .......................... 381/309
2014/0355765 A1* 12/2014 Kulavik et al. ................. 381/17

* cited by examiner

*Primary Examiner* — Lun-See Lao
(74) *Attorney, Agent, or Firm* — Sheppard Mullin Richter & Hampton LLP

(57) ABSTRACT

A hybrid ultrasonic audio system includes one or more ultrasonic speakers and one or more conventional speakers. An optical imaging system may be used to automatically determine the distance of a listener relative to the audio system. Channel processors apply distance-related transfer function filters to one or more of the audio channels based on the determined distances to equalize the amplitude of the audio played by the ultrasonic speakers relative to the conventional speakers. Channel processors may further apply a phase or time delay to the audio channels to match the phase and time delay of the ultrasonic speaker audio to the conventional speaker audio.

20 Claims, 5 Drawing Sheets

DISTANCE-BASED AUDIO PROCESSING FOR PARAMETRIC SPEAKER SYSTEM

CROSS-REFERENCE TO RELATED APPLICATIONS

This application claims the benefit of U.S. Patent Application No. 61/868,308 filed on Aug. 21, 2013, which is incorporated herein by reference in its entirety.

TECHNICAL FIELD

The present disclosure relates generally to parametric speakers for a variety of applications. More particularly, some embodiments relate to distance-based audio processing for a parametric speaker system.

BACKGROUND OF THE INVENTION

Non-linear transduction results from the introduction of sufficiently intense, audio-modulated ultrasonic signals into an air column. Self-demodulation, or down-conversion, occurs along the air column resulting in the production of an audible acoustic signal. This process occurs because of the known physical principle that when two sound waves with different frequencies are radiated simultaneously in the same medium, a modulated waveform including the sum and difference of the two frequencies is produced by the non-linear (parametric) interaction of the two sound waves. When the two original sound waves are ultrasonic waves and the difference between them is selected to be an audio frequency, an audible sound can be generated by the parametric interaction.

Parametric audio reproduction systems produce sound through the heterodyning of two acoustic signals in a non-linear process that occurs in a medium such as air. The acoustic signals are typically in the ultrasound frequency range. The non-linearity of the medium results in acoustic signals produced by the medium that are the sum and difference of the acoustic signals. Thus, two ultrasound signals that are separated in frequency can result in a difference tone that is within the 60 Hz to 20,000 Hz range of human hearing.

SUMMARY

Embodiments of the technology described herein include ultrasonic audio systems for a variety of different applications that utilize a parametric audio signal processing system which implements distance-based audio processing.

In accordance with one embodiment, a method of producing parametric audio in audio system comprising an ultrasonic speaker and a conventional audio speaker can include determining a distance of a listener relative to either or both of the ultrasonic speaker and the conventional audio speaker. Additionally, first and second input audio signals are received at a parametric audio processor. The first input audio channel signal is processed for output by the first ultrasonic speaker, and the second input audio channel signal is processed for output by the conventional speaker. The processing comprises applying a first distance-related transfer function to either or both of the first and second input audio channel signals based on the determined distance to equalize the amplitude of the audio signals from the conventional audio speaker and the ultrasonic speaker at the determined distance.

In accordance with another embodiment, a parametric audio system, comprises an ultrasonic speaker, a conventional speaker, means for determining a distance of a listener relative to the parametric audio system, and a parametric audio processor. The parametric audio processor comprises circuitry for receiving first and second input audio channel signals. The parametric audio processor also comprises a channel processor configured to apply a distance-related transfer function to at least one of the first and second input audio channel signals based on the determined distance to equalize the amplitude of the audio provided by the ultrasonic speaker relative to the audio provided by the conventional speaker at the determined distance. Further still, the parametric audio processor includes a modulator configured to modulate the first audio channel signal onto an ultrasonic carrier to generate an audio-modulated ultrasonic signal for playback by the ultrasonic speaker.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the accompanying figures. The drawings are provided for purposes of illustration only and merely depict typical or example embodiments of the invention. These drawings are provided to facilitate the reader's understanding of the systems and methods described herein, and shall not be considered limiting of the breadth, scope, or applicability of the claimed invention.

The figures are not intended to be exhaustive or to limit the invention to the precise form disclosed. It should be understood that the invention can be practiced with modification and alteration, and that the invention be limited only by the claims and the equivalents thereof.

DESCRIPTION

Embodiments of the systems and methods described herein provide a HyperSonic Sound (HSS) audio system or other ultrasonic audio system for a variety of different applications. Certain embodiments provide a parametric audio signal processing system that implements distance-based audio processing.

Figure 1:
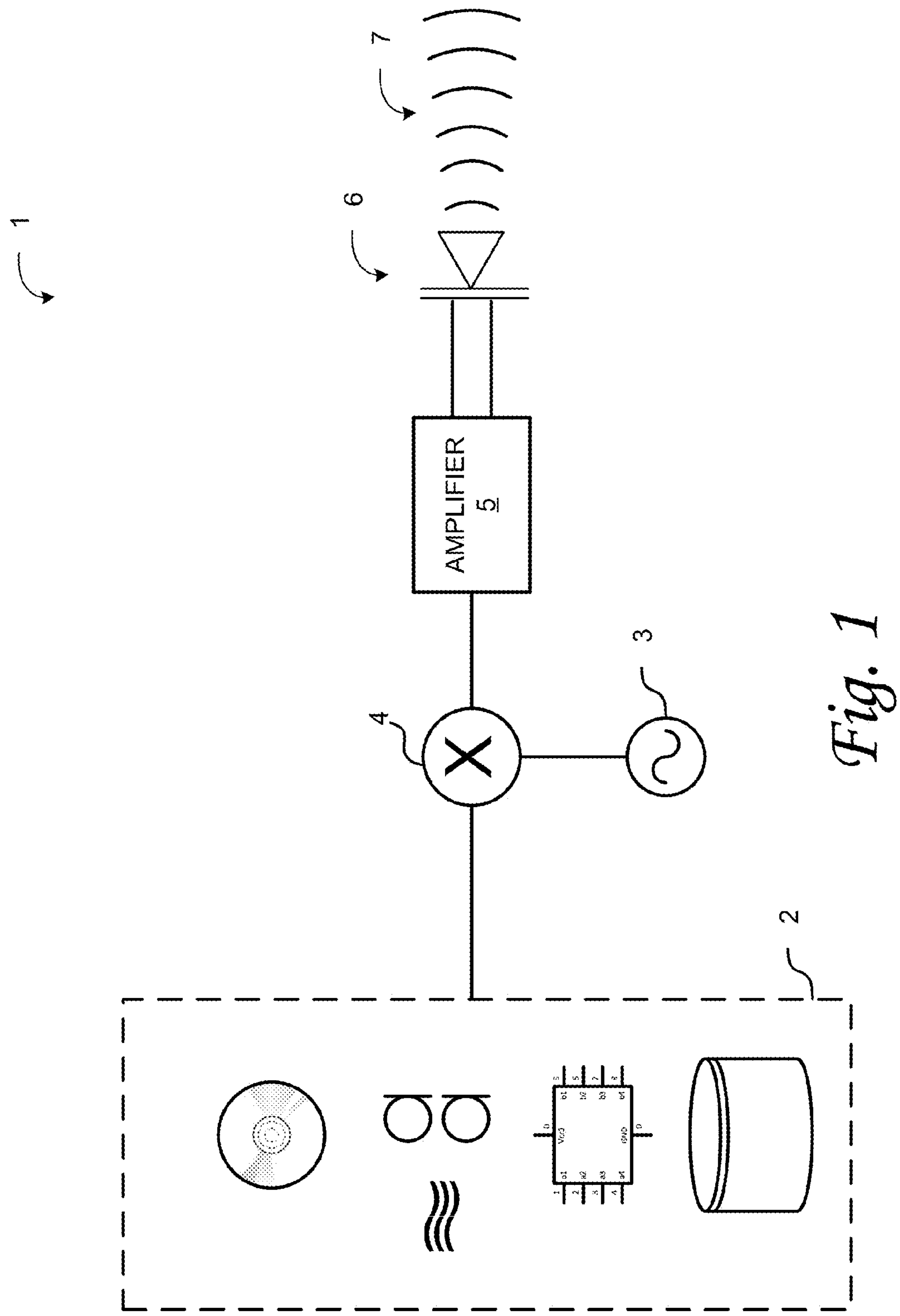
FIG. 1 is a diagram illustrating an ultrasonic sound system suitable for use with the emitter technology described herein.

FIG. 1 is a diagram illustrating an ultrasonic sound system suitable for use in conjunction with the systems and methods described herein. In this exemplary ultrasonic system 1, audio content from an audio source 2, such as, for example, a microphone, memory, a data storage device, streaming media source, MP3, CD, DVD, set-top-box, or other audio source is received. The audio content may be decoded and converted from digital to analog form, depending on the source. The audio content received by the audio system 1 is modulated onto an ultrasonic carrier of frequency f1, using a modulator. The modulator typically includes a local oscillator 3 to generate the ultrasonic carrier signal, and multiplier 4 to modulate the audio signal on the carrier signal. The resultant signal is a double- or single-sideband signal with a carrier at frequency f1 and one or more side lobes. In some embodiments, the signal is a parametric ultrasonic wave or a HSS signal. In most cases, the modulation scheme used is amplitude modulation, or AM, although other modulation schemes can be used as well. Amplitude modulation can be achieved by multiplying the ultrasonic carrier by the information-carrying signal, which in this case is the audio signal. The spectrum of the modulated signal can have two sidebands, an upper and a lower side band, which are symmetric with respect to the carrier frequency, and the carrier itself.

The modulated ultrasonic signal is provided to the transducer 6, which launches the ultrasonic signal into the air creating ultrasonic wave 7. When played back through the transducer at a sufficiently high sound pressure level, due to nonlinear behavior of the air through which it is 'played' or transmitted, the carrier in the signal mixes with the sideband(s) to demodulate the signal and reproduce the audio content. This is sometimes referred to as self-demodulation. Thus, even for single-sideband implementations, the carrier is included with the launched signal so that self-demodulation can take place.

Although the system illustrated in FIG. 1 uses a single transducer to launch a single channel of audio content, one of ordinary skill in the art after reading this description will understand how multiple mixers, amplifiers and transducers can be used to transmit multiple channels of audio using ultrasonic carriers. The ultrasonic transducers can be mounted in any desired location depending on the application.

Figure 2:
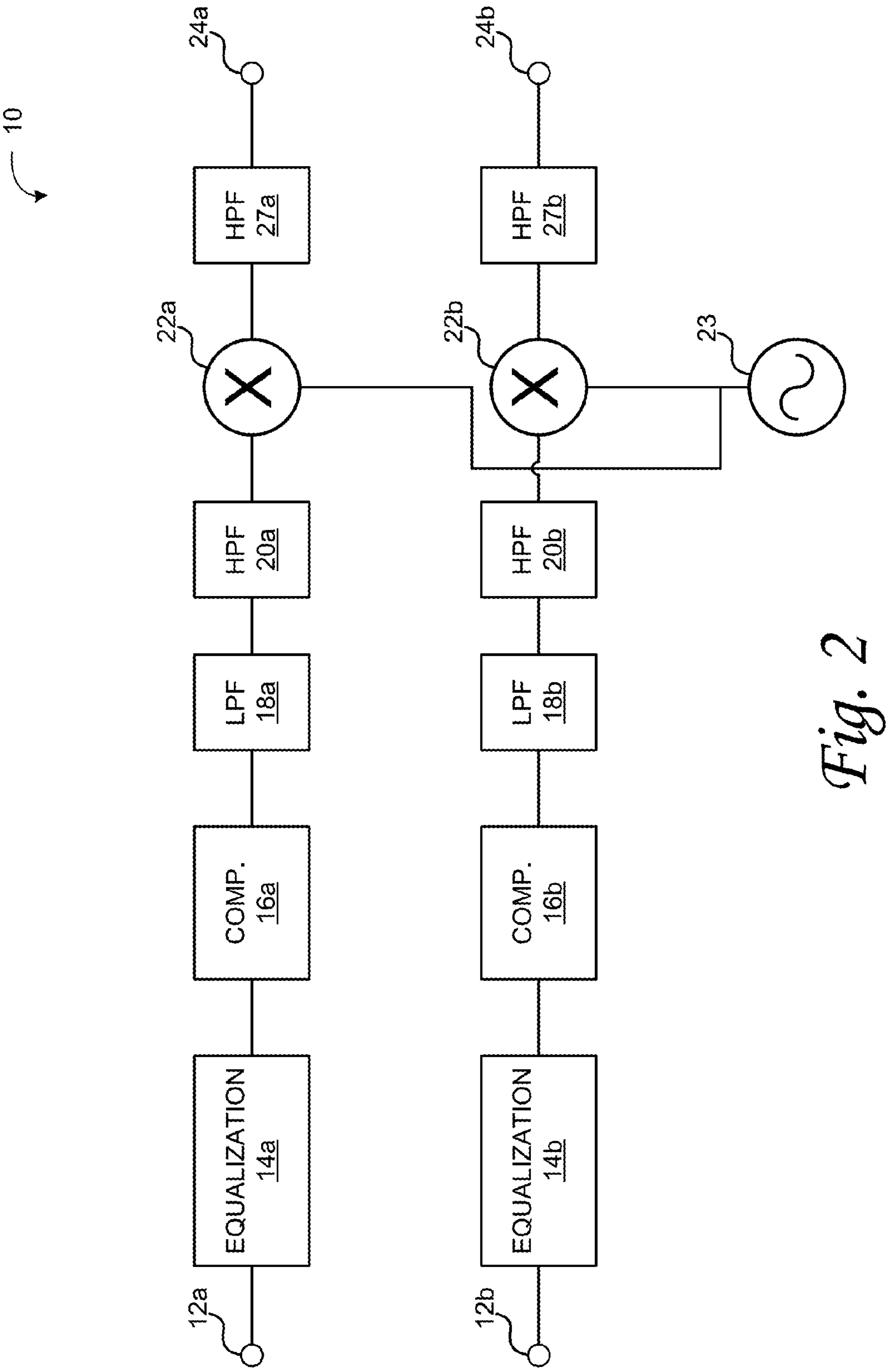
FIG. 2 is a diagram illustrating another example of a signal processing system that is suitable for use with the emitter technology described herein.

One example of a signal processing system 10 that is suitable for use with the technology described herein is illustrated schematically in FIG. 2. In this embodiment, various processing circuits or components are illustrated in the order (relative to the processing path of the signal) in which they are arranged according to one implementation. It is to be understood that the components of the processing circuit can vary, as can the order in which the input signal is processed by each circuit or component. Also, depending upon the embodiment, the processing system 10 can include more or fewer components or circuits than those shown.

Also, the example shown in FIG. 1 is optimized for use in processing two input and output channels (e.g., a "stereo" signal), with various components or circuits including substantially matching components for each channel of the signal. It will be understood by one of ordinary skill in the art after reading this description that the audio system can be implemented using a single channel (e.g., a "monaural" or "mono" signal), two channels (as illustrated in FIG. 2), or a greater number of channels.

Referring now to FIG. 2, the example signal processing system 10 can include audio inputs that can correspond to left 12*a* and right 12*b* channels of an audio input signal. Equalizing networks 14*a*, 14*b* can be included to provide equalization of the signal. The equalization networks can, for example, boost or suppress predetermined frequencies or frequency ranges to increase the benefit provided naturally by the emitter/inductor combination of the parametric emitter assembly.

After the audio signals are equalized compressor circuits 16*a*, 16*b* can be included to compress the dynamic range of the incoming signal, effectively raising the amplitude of certain portions of the incoming signals and lowering the amplitude of certain other portions of the incoming signals. More particularly, compressor circuits 16*a*, 16*b* can be included to narrow the range of audio amplitudes. In one aspect, the compressors lessen the peak-to-peak amplitude of the input signals by a ratio of not less than about 2:1. Adjusting the input signals to a narrower range of amplitude can be done to minimize distortion, which is characteristic of the limited dynamic range of this class of modulation systems. In other embodiments, the equalizing networks 14*a*, 14*b* can be provided after compressors 16*a*, 16*b*, to equalize the signals after compression.

Low pass filter circuits 18*a*, 18*b* can be included to provide a cutoff of high portions of the signal, and high pass filter circuits 20*a*, 20*b* providing a cutoff of low portions of the audio signals. In one exemplary embodiment, low pass filters 18*a*, 18*b* are used to cut signals higher than about 15-20 kHz, and high pass filters 20*a*, 20*b* are used to cut signals lower than about 20-200 Hz.

The high pass filters 20*a*, 20*b* can be configured to eliminate low frequencies that, after modulation, would result in deviation of carrier frequency (e.g., those portions of the modulated signal that are closest to the carrier frequency). Also, some low frequencies are difficult for the system to reproduce efficiently and as a result, much energy can be wasted trying to reproduce these frequencies. Therefore, high pass filters 20*a*, 20*b* can be configured to cut out these frequencies.

The low pass filters 18*a*, 18*b* can be configured to eliminate higher frequencies that, after modulation, could result in the creation of an audible beat signal with the carrier. By way of example, if a low pass filter cuts frequencies above 15 kHz, and the carrier frequency is approximately 44 kHz, the difference signal will not be lower than around 29 kHz, which is still outside of the audible range for humans. However, if frequencies as high as 25 kHz were allowed to pass the filter circuit, the difference signal generated could be in the range of 19 kHz, which is within the range of human hearing.

In the example system 10, after passing through the low pass and high pass filters, the audio signals are modulated by modulators 22*a*, 22*b*. Modulators 22*a*, 22*b*, mix or combine the audio signals with a carrier signal generated by oscillator 23. For example, in some embodiments a single oscillator (which in one embodiment is driven at a selected frequency of 40 kHz to 50 kHz, which range corresponds to readily available crystals that can be used in the oscillator) is used to drive both modulators 22*a*, 22*b*. By utilizing a single oscillator for multiple modulators, an identical carrier frequency is provided to multiple channels being output at 24*a*, 24*b* from the modulators. Using the same carrier frequency for each channel lessens the risk that any audible beat frequencies may occur.

High-pass filters 27*a*, 27*b* can also be included after the modulation stage. High-pass filters 27*a*, 27*b* can be used to pass the modulated ultrasonic carrier signal and ensure that no audio frequencies enter the amplifier via outputs 24*a*, 24*b*. Accordingly, in some embodiments, high-pass filters 27*a*, 27*b* can be configured to filter out signals below about 25 kHz.

Figure 3:
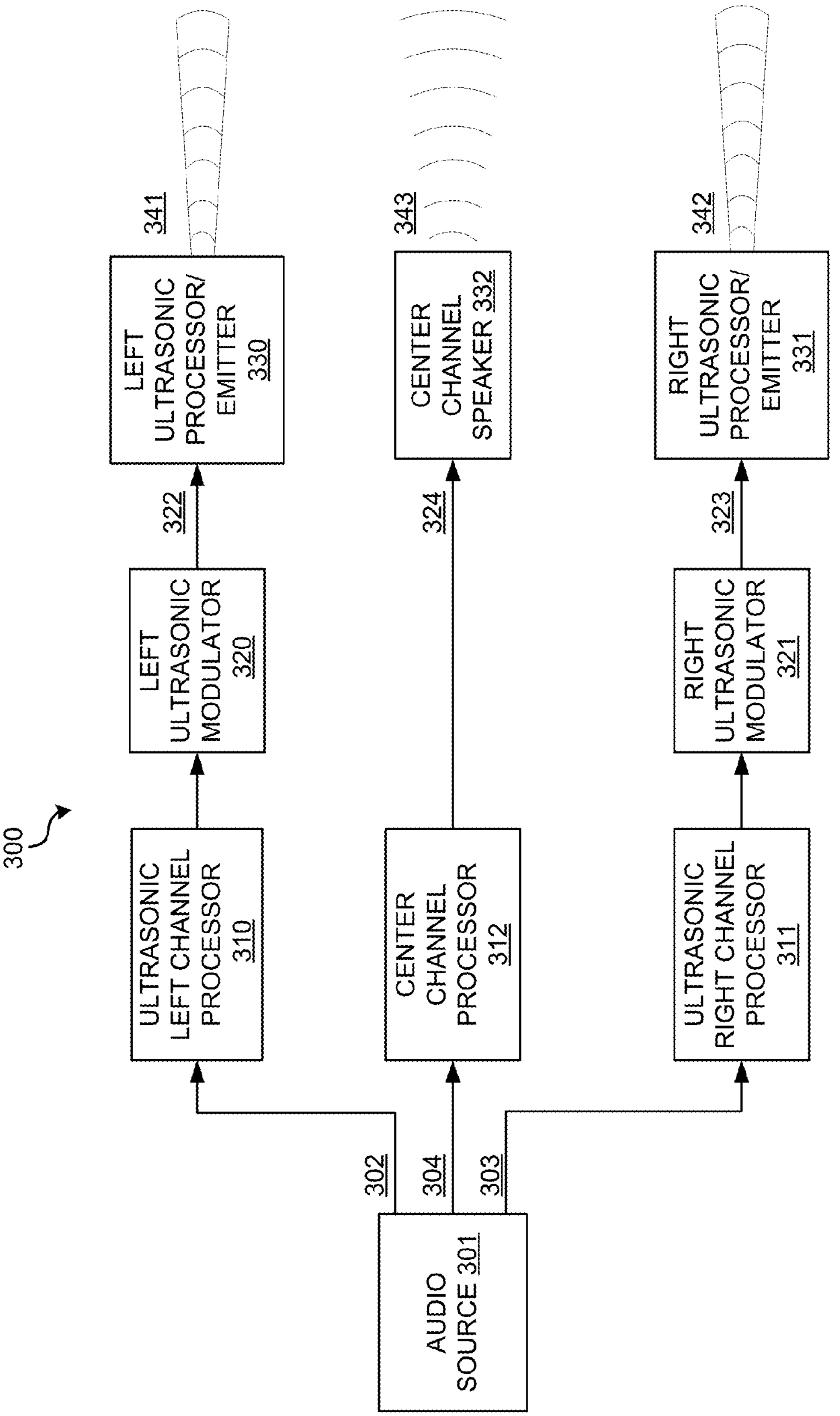
FIG. 3 is a schematic diagram illustrating example circuitry for a three-channel parametric audio signal processing system that is suitable for use with the technology described herein.

FIG. 3 is a block diagram illustrating an example system with which the technology disclosed herein may be implemented. Particularly, the example illustrated in FIG. 3 is an example of a three-channel audio signal processing system 300 and includes two ultrasonic emitters 330, 331 and a center channel conventional speaker 332. Conventional speaker 332 may comprise a conventional audio speaker such as a dynamic loudspeaker that converts electrical signals into audible signals such as, for example, through a driven voice coil and cone to create sound pressure waves. Although embodiments of the technology disclosed herein are described in terms of the example system 300 of FIG. 3, after reading this description, one of ordinary skill in the art will understand how to implement the technology disclosed herein in other hybrid systems including systems having other quantities and combinations of one or more ultrasonic emitter(s) and one or more conventional audio speaker(s).

In this example environment, system 300 encodes a three-channel audio source 301 for playback by two ultrasonic speakers and one conventional speaker. Other applications may utilize a different number of audio channels and a different combination of ultrasonic speakers and conventional speakers. The illustrated example includes input channel signals 302-304 into 1) a left ultrasonic frequency modulated output channel signal 322 for processing and transmission by ultrasonic processor/emitter 330 as ultrasonic beam 341; 2) a right ultrasonic frequency modulated output channel signal 323 for processing and transmission by ultrasonic processor/emitter 331 as ultrasonic beam 342; and 3) a center baseband-audio output channel signal 324 for processing and transmission by speaker 324 as sound wave 343. The illustrated system 300 comprises ultrasonic channel processors 310-311 and center channel processor 312 configured to adjust the audio parameters of a respective input channel signal 302-304. As further described below, ultrasonic channel processors 310 and 311 comprise distance-related transfer function filters for encoding input channel signals 302 and 303 such that ultrasonic beams 341 and 342 mimic the free space propagation loss (i.e. attenuation in amplitude, change in phase, change in frequency, etc.) that a conventional sound pressure wave experiences as it propagates through the listening environment.

This can be beneficial in ultrasonic audio systems as well as in hybrid ultrasonic/conventional audio systems such as the example system shown in FIG. 3. For example, because the volume of conventional audio sound wave 343 will generally diminish with distance at a faster rate than the audio delivered by ultrasonic beams 341 and 342, the audio delivered by ultrasonic beams 341 and 342 can be adjusted relative to that of the audio delivered by audio sound wave 343 to create a desired listening experience. For example, the relative signal levels can be adjusted based on the distance to a listener so that the conventional and ultrasonic audio sound arriving at the listener are equalized or balanced in volume. The equalization may not result in perfect balance between the conventional and ultrasonic audio signals, but preferably at least brings them closer together in perceived volume to improve the listening experience.

By way of further example, given a known distance to a listener or listening area, the attenuation of the conventional audio sound pressure wave can be calculated. This distance-based attenuation head can be, for example, in accordance with the commonly understood inverse square law (described further below). This attenuation, does not exist to the same extent (and in many cases, does not even exist at any perceivable level) for the audio signal delivered by the ultrasonic emitters. Accordingly, at a given distance, the sound levels experienced by the listener will differ between the sound delivered by the conventional speaker and the sound delivered by the ultrasonic emitters. This difference generally increases as the distance increases. Therefore, the system can be configured to compensate for this by increasing the volume of the sound delivered by the conventional speaker or speakers, attenuating the sound delivered by the ultrasonic emitter or emitters, or implementing some combination of the two.

Figure 4:
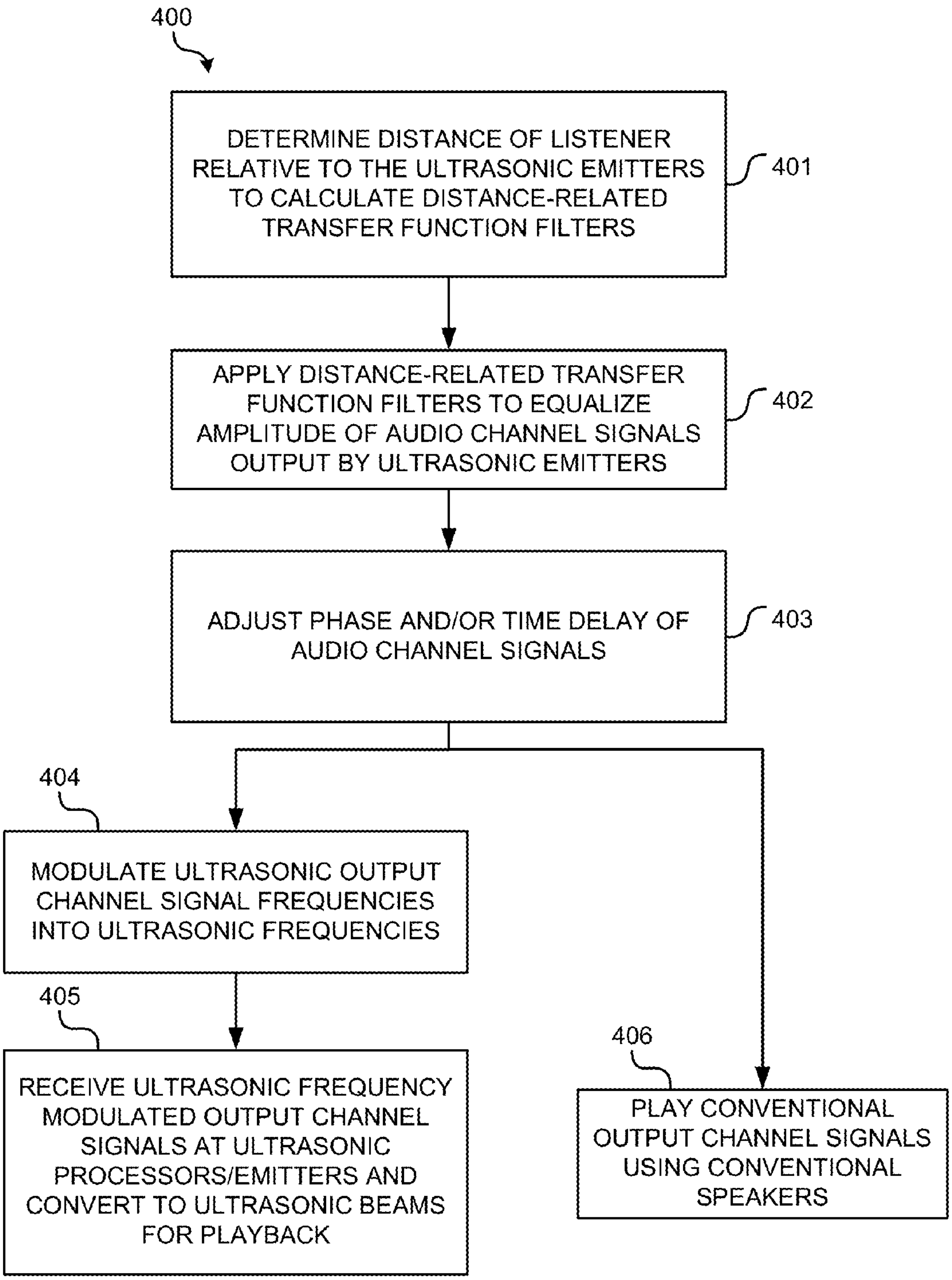
FIG. 4 is an operational flow diagram illustrating an example process for encoding audio for audio systems using any combination of one or more ultrasonic speakers and one or more conventional speakers.

FIG. 4 is an operational flow diagram illustrating an example method 400 of encoding audio in accordance with the technology described herein. Particularly, FIG. 4 describes an example process 400 for encoding audio for audio systems using any combination of one or more ultrasonic speakers and one or more conventional speakers. For ease of description and clarity of understanding, however, FIG. 4 is also described in the context of encoding audio with a system having two ultrasonic emitters and one conventional speaker as shown in audio system 300. After reading this description, it will become apparent to one of ordinary skill in the art how to implement this process with other ultrasonic or hybrid systems.

Referring now to FIG. 400, at operation 401 the distance of the listener is calculated relative to the audio system. For example, the distance between the listener and one more of the ultrasonic emitters or conventional audio speakers in the audio system can be calculated. In various embodiments, one distance calculation can be sufficient. In other embodiments, multiple distance calculations can be made between the various emitters and speakers. Examples of systems and techniques that can be used for such distance measurements are described in more detail below.

In terms of the example of system 300, the distance from the audio system to the listener is determined. The distance can be determined from any one of the ultrasonic emitters 330, 331 or from the center channel speaker 332 or can be determined from a point proximal to the emitters or speaker. In one embodiment, it may be preferable to measure the distance from the conventional audio speaker (e.g., center channel speaker 332 in the example of FIG. 3) as it is the distance from this speaker to the listener that determines the attenuation in volume of the conventional audio signal.

The calculated distance is used to determine one or more transfer function filters that may be applied to the left and right audio channel signals modulated and output by ultrasonic processors/emitters 330 and 331. The transfer functions in various embodiments emulate the free space propagation loss (i.e. changes in amplitude and other properties) that sound waves experience while propagating in free space. These transfer functions are based on the principle that the volume of sound generated in air by the ultrasonic sound column does not diminish as a function of distance to the same extent that the volume of the conventional audio sound pressure wave normally does in free space.

Particularly, the amplitude of the ultrasonic sound column remains approximately constant as it propagates through most open space listening environments. This contrasts with the amplitude of the conventional audio sound wave, which diminishes with distance at a much faster rate. In some instances, this is undesirable because the listener may perceive the sound produced by the ultrasonic emitter as unnatural or imbalanced (e.g. too loud) relative to the sound produced by the conventional speaker. Accordingly, the disclosed transfer function filters may be implemented to improve the quality of the sound effect produced by the hybrid audio system by adjusting the amplitude (and in some embodiments, other properties) of the ultrasonic audio signals. As noted above, this can be done to mimic the attenuation in volume that a conventional sound wave experiences when propagating in free space through the distance of the listening environment. This can be implemented to help to equalize or balance the listener-perceived volume levels between the ultrasonic and conventional audio signals.

In one embodiment, the calculated distance transfer function for each ultrasonic emitter is based on the path loss of a conventional audio signal in free space as represented by Equation (1):

$$FSPL=(4\times 7\pi\times d/\lambda)^2 \quad (1)$$

Where d is the distance from the ultrasonic emitter to the listener's head, and λ is the wavelength of the signal.

In one embodiment, a listener may manually enter the listener's distances to the ultrasonic emitters. For example, the system can be configured to store a plurality of predetermined distances and a user selection can be made, for example, by switches or by a menu selection via a keyboard or GUI. The predetermined distances can be selected based on typical distances that are encountered for applications in which the system is intended. In other embodiments, user input means such as, for example, keyboard or GUI input, can be provided to allow the user to enter a specific distance measured or estimated by the user.

Alternatively, as introduced above, a distance determination module may be used to determine the distance of the listener relative to conventional audio speakers (e.g., center channel speaker 332), or relative to the ultrasonic emitters (e.g. left and right ultrasonic emitters 330, 331). The distance determination module may include one or more location sensors that may be collocated with an ultrasonic emitter, a conventional speaker, or that may be located elsewhere in the listening environment. The location sensor can include, for example, optical, infrared, sonic, ultrasonic, RF, radar, and other sensors. The determination module may comprise suitable circuitry, interfaces, logic, and/or code that may be operable to determine the distance of one or more listeners in the listening environment relative to the audio system (e.g. relative to conventional speakers or ultrasonic emitters).

The distance-determination module may determine the relative distance for distances, for example, by employing one or more location sensors that sense the location of the listener. Multiple location sensors can be included with the system and mounted at different locations in the listening environment such that a listener's distance or position can be accurately determined. For example, location sensors can be wall mounted, ceiling mounted, mounted on stands, mounted on or as part of the emitter, be integrated as a part of the audio equipment (e.g., sources 2 of FIG. 1) or the emitter system, and so on.

The distance-determination module may be configured to use information obtained by one or more location sensors to determine the distance of one or more listeners in the listener environment. In one embodiment, facial recognition or other individual recognition techniques can be used to allow the sensor and tracking module to automatically recognize a listener and determine the distance of a particular listener relative to ultrasonic emitters in the listening environment.

In addition to facial recognition, other identification techniques can be used to identify the relative position (and distance) of a listener in the listening environment. For example, RFID tags or other location tags can be used. In a larger environment, GPS, cellular, or other like technologies can be used to track a listener and that information fed to the emitter system such as, for example, via a communications module.

In one embodiment, an optical imaging system may be used to determine the distance of the listener relative to the ultrasonic emitters. The optical imaging system may comprise one or more digital cameras and a depth sensor. The digital cameras may be used in conjunction with a facial recognition module for recognizing the listener. The depth sensor may include a separate sensor or it can be configured to determine the distance based on images received from multiple cameras. The depth sensor measures the listener's distance relative to the audio system. The cameras may also be used to determine a position of the listener in the listening environment in addition to the distance. Based on position, electronic (e.g., phased array) or mechanical controls can be used to steer the ultrasonic signals toward the listener. Additionally, convex-shaped ultrasonic emitters may be employed to provide a wider beam coverage for the ultrasonic signals.

As another example, distance information can be determined from a videogame controller in a gaming environment. Information sent by a signal emitted from the controller can be used to track the distance of the controller relative to the ultrasonic emitters and, accordingly, the distance-related transfer function may be adjusted based on the tracked distance between the controller and the ultrasonic emitters.

As yet another example, one or more of the ultrasonic emitters themselves can be used as a mechanism to determine the distance to the listener or listening position. This can be done by including a receiver to receive the ultrasonic signal emitted from the ultrasonic emitter(s) and to calculate the delay (time of flight) of the received ultrasonic signal relative to when the signal was launched by the emitter. From this delay measurement, the distance can be determined.

In further embodiments, the system can be configured not only to identify the distance of the listener, but to further identify the distance of the listener's head in particular. In this manner, the distance-related transfer function can be more precisely adjusted to the listener's head as opposed to the listener in general. Head detection may be accomplished by a number of techniques including, for example, visual detection and identification of the head based on its shape or size, or based on markers that the user wears on his or her head, face, or other location proximal the head or ears.

As these examples serve to illustrate, there are a number of techniques that can be used to identify a listener and determine the distance of the listener relative to the ultrasonic emitters. The determined distances may be stored as a custom profile on a computer readable medium. For example, when the listener subsequently initiates the system, use of the system may only require the listener's selection of the saved profile.

Once the distance-related transfer functions are determined, the parametric audio signal processing system may process any number of input audio signals for any combination of ultrasonic speakers and conventional speakers. System 300, for example, may process input audio signals 302, 303, 304 to equalize the levels (e.g., the volume) of the audio perceived by the listener at the determined listener location. At operation 402, ultrasonic channel processors apply distance-related transfer functions to equalize the amplitude of the audio channel signals output by the ultrasonic emitters. For example, in some embodiments, the amplitude of the signal or signals delivered by one or more ultrasonic emitters in the system is attenuated such that the volume of the ultrasonic audio delivered to the listener to more closely match the volume of the conventionally delivered audio.

In terms of the example of system 300, channel processors 310 and 311 adjust the amplitude of channel signals 302 and 303, respectively, based on the listener's distance to the audio source, thereby emulating the free space propagation loss (i.e. attenuation in amplitude as the inverse square of distance) that the conventional sound waves from center channel speaker 332 experience while propagating in free space. In one embodiment, the amplitude of the signals for each ultrasonic emitter can be adjusted same or similar to one another. In a further embodiment, the amplitude of each signal for each ultrasonic emitter can be adjusted independently and perhaps differently from one emitter to the next. For example, distance measurements can be made from each ultrasonic emitter to the listener and the attenuation adjusted accordingly. However, because the natural attenuation of the ultrasonic signal is minimal, in most applications it will be sufficient to adjust the ultrasonic signals across multiple emitters in a similar fashion.

In an alternative embodiment, the audio signal processing system 300 can amplify or otherwise adjust the signal provided to one or more conventional speakers (e.g. center channel speaker 332) such that its volume when it reaches the listener is equalized (i.e. is at least more closely balanced with) with the audio delivered by one or more ultrasonic emitters (e.g. ultrasonic emitters 330, 331). That is, the amplitude or volume of the conventional audio signal can be increased such that when the audio sound wave reaches the listener is at approximate the same volume as the audio signal produced by the ultrasonic emitter or emitters. Where multiple conventional speakers are provided and where their distances to the listener may differ, different transfer functions can be applied to the different conventional speakers to reach a desired equalization of the volume of the sound wave from each speaker as it reaches the listener.

In still further embodiments, amplitude adjustments can be made to both the ultrasonic audio signals and the conventional audio signals (e.g. signals 322, 323, 324) to achieve the desired level of balance or equalization. In yet further embodiments, the distance-related transfer functions may be further configured to adjust the frequency and/or phase of the signal or signals as well.

At operation 403, the phase and/or time delay of the ultrasonic and/or conventional audio channel signals may be further adjusted. More particularly, because of the different propagation characteristics the of ultrasonic beams emitted by the ultrasonic emitters (e.g. emitters 330-331) versus the sound waves emitted by conventional speakers (e.g. center channel speaker 332), there may be an unnatural phase and/or time delay between the ultrasonic audio relative to the conventional audio. In system 300, for example, center channel processor 312 may apply phase and/or time delay filters to input audio signal 304. In further implementations of this embodiment, left channel processor 310 and right channel processor 311 may also apply phase and/or time delay filters to their respective audio signals.

In further embodiments, the channel processors of the parametric audio system may apply additional filters to the audio channel signals to further enhance the sound effect. For example, the system can be configured to adjust parameters such as the, gain, reverb, echo, or other audio parameters, as described above, to enhance the sound effect.

At operation 404, the ultrasonic output channel signals (i.e. the processed audio signals intended for playback by the ultrasonic emitters) are modulated or upconverted to ultrasonic frequencies. For example, in system 300 left ultrasonic modulator 320 and right ultrasonic modulator 321 modulate the left and right audio channel signals 322, 323, respectively. In this embodiment, the ultrasonic-frequency modulated output signals 322 and 323 are played by ultrasonic emitters.

At operation 405, the audio-modulated ultrasonic signals are received by the ultrasonic emitters for playback. The emitters launch the corresponding ultrasonic signals into the listening environment. For example, in terms of system 300, the modulated left output channel signal 322 is received by left ultrasonic processor/emitter 330 and the modulated right output channel signal 323 is received by right ultrasonic processor/emitter 331. During concurrent operation 406, the conventional output audio channel signals are played back using conventional speakers. In system 300, for example, channel speaker 332 receives baseband center channel signal 324 and processes it for playback as sound wave 343. Based on the audio signal processing described above, the ultrasonic beams (e.g. 341-342) and sound waves (e.g. 343) arrive with the proper adjustments (i.e. amplitude and other properties) as if the audio channels were all transmitted via conventional speakers, thereby generating a realistic sound effect.

In additional embodiments, system 300 may include additional components for processing the audio content and modulating the content onto an ultrasonic carrier such as, for example, processing modules described above with reference to FIGS. 1 and 2. In yet further embodiments, the reflection and filtering properties of the listening environment may also be considered as filter parameters for the channel processors.

In some embodiments, the ultrasonic processors/emitters can comprise an amplifier and an ultrasonic emitter such as, for example, a conventional piezo or electrostatic emitter. Examples of filtering, modulation and amplification, as well as example emitter configurations are described in U.S. Pat. No. 8,718,297, titled Parametric Transducer and Related Methods, which is incorporated herein by reference in its entirety.

In further embodiments, the ultrasonic processors/emitters may comprise a location-tracking module (e.g. optical imaging system) and suitable electrical and/or mechanical hardware (e.g. motor for pivoting the emitters) for dynamically tracking the position of the listener as the listener moves through the listening environment. In these embodiments, as the listener moves through the listening environment (i.e. changes distance with respect to each speaker), the distance-related transfer functions are dynamically updated. In an alternative embodiment, the ultrasonic processors/emitters are configured as convex emitters that emit the ultrasonic column over a wider area of the listening environment, thereby reaching the listener at various locations in the listening environment without the requirement for additional hardware for moving the emitter.

Figure 5:
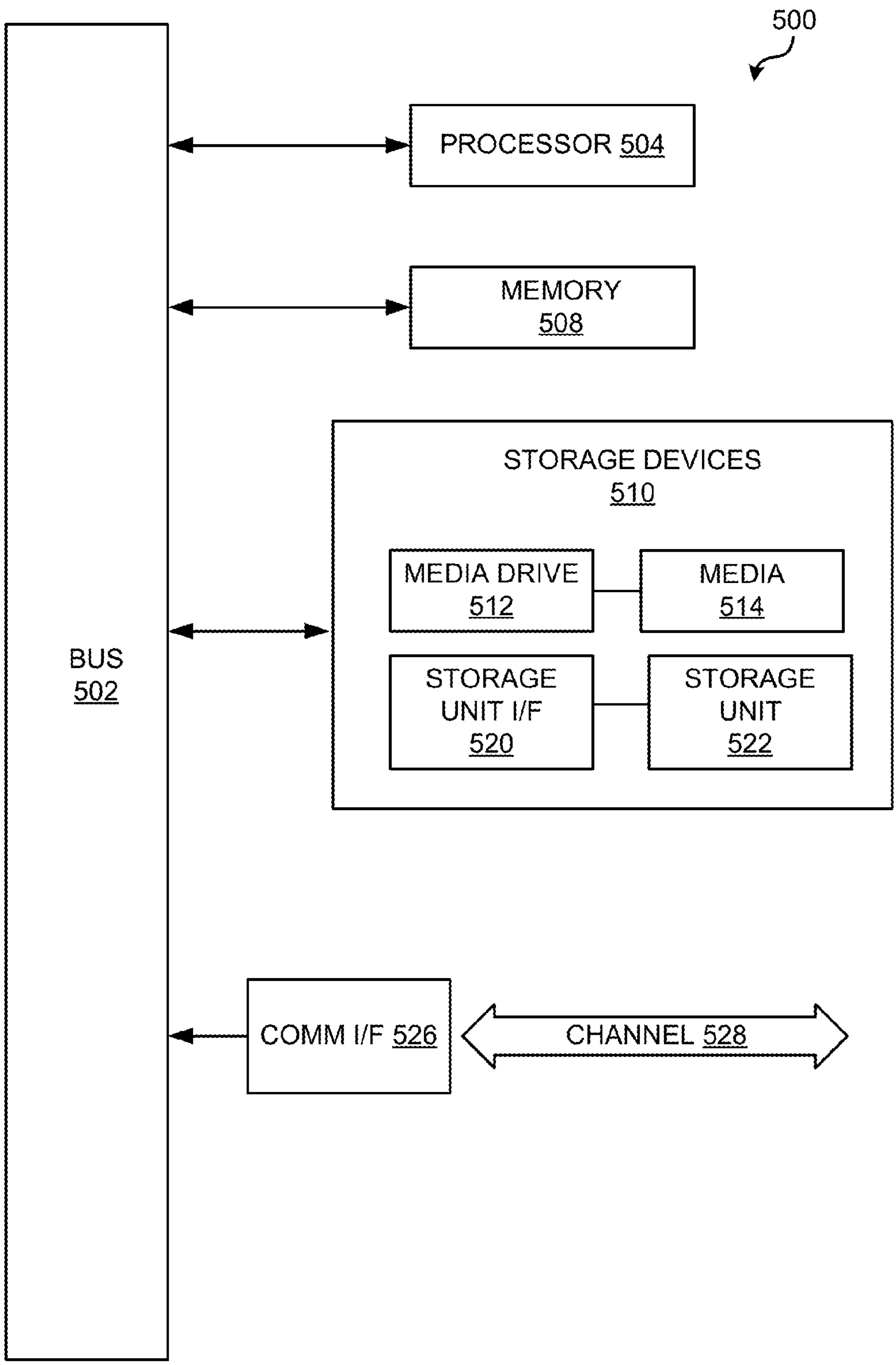
FIG. 5 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 5. Various embodiments are described in terms of this example-computing module 500. After reading this description, it will become apparent to a person skilled in the relevant art how to implement the technology using other computing modules or architectures.

Referring now to FIG. 5, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid state drive, a magnetic tape drive, an optical disk drive, a CD or DVD drive (R or RW), or other removable or fixed media drive might be provided. Accordingly, storage media 514 might include, for example, a hard disk, an integrated circuit assembly, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the disclosed technology as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of producing parametric audio in an audio system comprising an ultrasonic speaker and a conventional speaker, the method comprising:

determining a distance of a listener relative to either or both of the ultrasonic speaker and the conventional speaker;

receiving first and second input audio channel signals at a parametric audio processor;

processing the first input audio channel signal for playback by the ultrasonic speaker, and processing the second input audio channel signal for playback by the conventional speaker; and playing the processed first input audio channel signal using the ultrasonic speaker, and playing the processed second input audio channel signal using the conventional speaker;

wherein processing the first input audio channel signal for playback by the ultrasonic speaker comprises mixing or combining the first input audio channel signal with an ultrasonic carrier signal generated by an oscillator to generate an audio-modulated ultrasonic signal for playback by the ultrasonic speaker; and wherein the processing comprises applying a distance-related transfer function to either or both of the first and second input audio channel signals based on the determined distance to adjust the amplitude of either or both of the first and second input audio channel signals such that the volume of the audio signal played by the conventional speaker and the volume of the audio signal played by the ultrasonic speaker are equalized for the listener at the determined distance.

2. The method of claim 1, wherein the processing further comprises applying at least one of a phase or time delay to at least one of the first and second input audio channel signals.

3. The method of claim 2, wherein the distance-related transfer function is based on the free space propagation loss that a sound pressure wave experiences as it propagates through the determined distance.

4. The method of claim 3, wherein the distance-related transfer function attenuates the amplitude of the first input audio channel signal.

5. The method of claim 4, wherein the distance-related transfer function changes the frequency of the first input audio channel signal.

6. The method of claim 2, wherein the processing comprises applying at least one of amplitude adjustment, a phase delay and a time delay to the first input audio channel signal to more closely match at least one of the amplitude, phase delay and time delay of the audio signal played by the conventional speaker relative to the audio signal played by the ultrasonic speaker.

7. The method of claim 2, wherein the distance is determined by an optical imaging system configured to recognize the listener.

8. The method of claim 7, wherein the optical imaging system comprises a digital camera and a depth sensor.

9. The method of claim 8 wherein the distance is based on the distance from the ultrasonic speaker to the listener's head.

10. A parametric audio system, comprising:

an ultrasonic speaker;

a conventional speaker;

means for determining a distance of a listener relative to the parametric audio system; and a parametric audio processor comprising:

circuitry for receiving first and second input audio channel signals;

a channel processor configured to apply a distance-related transfer function to at least one of the first and second input audio channel signals based on the determined distance to adjust the amplitude of either or both of the first and second input audio channel signals such that the volume of audio played by the ultrasonic speaker and the volume of audio played by the conventional speaker are equalized for the listener at the determined distance; and a modulator configured to modulate the first input audio channel signal onto an ultrasonic carrier to generate an audio-modulated ultrasonic signal for playback by the ultrasonic speaker, wherein the modulator generates the audio-modulated ultrasonic signal by mixing or combining the first audio channel signal with an ultrasonic carrier signal generated by an oscillator.

11. The system of claim 10, wherein the channel processor is further configured to apply at least one of a phase or time delay to at least one of the first and second input audio channel signals.

12. The system of claim 11, wherein the distance-related transfer function is based on the free space propagation loss that a sound wave experiences as it propagates through the distance.

13. The system of claim 12, wherein the distance-related transfer function attenuates the amplitude of the first input audio channel signal.

14. The system of claim 13, wherein the distance-related transfer function changes the frequency of the first input audio channel signal.

15. The system of claim 12, wherein the distance-related transfer function increases the amplitude of the second input audio channel signal.

16. The system of claim 11, wherein the first channel processor applies at least one of a phase or time delay to the first input audio channel signal to further match the phase and time delay of the audio played by the conventional speaker relative to the audio played by the ultrasonic speaker.

17. The system of claim 11, further comprising an optical imaging system configured to automatically recognize the listener and determine the distance.

18. The system of claim 17, wherein the optical imaging system comprises a digital camera and a depth sensor.

19. The system of claim 17, wherein the distance is based on the distance from the ultrasonic speaker to the listener's head.

20. The system of claim 11, wherein the determined distance is a distance from the listener to at least one of the conventional speaker and the ultrasonic speaker.

* * * * *